United States Patent
Konchitsky

(10) Patent No.: US 8,606,573 B2
(45) Date of Patent: Dec. 10, 2013

(54) VOICE RECOGNITION IMPROVED ACCURACY IN MOBILE ENVIRONMENTS

(71) Applicant: Alon Konchitsky, Santa Clara, CA (US)

(72) Inventor: Alon Konchitsky, Santa Clara, CA (US)

( * ) Notice: Subject to any disclaimer, the term of this patent is extended or adjusted under 35 U.S.C. 154(b) by 0 days.

(21) Appl. No.: 13/664,992

(22) Filed: Oct. 31, 2012

(65) Prior Publication Data

US 2013/0060567 A1    Mar. 7, 2013

Related U.S. Application Data

(63) Continuation-in-part of application No. 12/413,477, filed on Mar. 27, 2009, now abandoned.

(60) Provisional application No. 61/040,273, filed on Mar. 28, 2008.

(51) Int. Cl.
| | |
|---|---|
| *G10L 15/00* | (2013.01) |
| *G10L 21/00* | (2013.01) |
| *H04B 15/00* | (2006.01) |
| *H03B 29/00* | (2006.01) |
| *H03K 5/01* | (2006.01) |
| *H04M 9/08* | (2006.01) |
| *H04B 3/20* | (2006.01) |

(52) U.S. Cl.
USPC ........... 704/233; 704/204; 704/225; 704/226; 381/94.3; 381/71.8; 370/286; 375/346; 379/406.02

(58) Field of Classification Search
USPC ............... 704/233, 204, 226, 225; 370/286; 381/94.3, 71.8; 375/346; 379/406.02
See application file for complete search history.

(56) References Cited

U.S. PATENT DOCUMENTS

| | | | |
|---|---|---|---|
| 5,406,622 A | 4/1995 | Silverberg et al. | |
| 5,969,838 A | 10/1999 | Paritsky et al. | |
| 6,363,345 B1 * | 3/2002 | Marash et al. | 704/226 |
| 6,377,637 B1 * | 4/2002 | Berdugo | 375/346 |
| 6,415,034 B1 | 7/2002 | Hietanen | |
| 6,453,289 B1 * | 9/2002 | Ertem et al. | 704/225 |
| 6,937,980 B2 | 8/2005 | Krasny et al. | |
| 7,242,765 B2 | 7/2007 | Hairston | |
| 7,359,504 B1 * | 4/2008 | Reuss et al. | 379/406.02 |

(Continued)

OTHER PUBLICATIONS

Entropy Based Voice Activity Detection in Very Noisy Conditions by Philippe Renevey and Andrzej Drygajlo, as published in ISCA, Eurospeech 2001 Scandinavia.*

(Continued)

*Primary Examiner* — Edgar Guerra-Erazo
*Assistant Examiner* — Neeraj Sharma
(74) *Attorney, Agent, or Firm* — Steven A. Nielsen; Allman & Nielsen, P.C.

(57) ABSTRACT

VoIP phones according to the present invention include a microphone, which may be internal or external, and allow the user to communicate unobtrusively, check voice mail and conduct other activities in an environment which can be noisy in general and extremely noisy sometimes. Speech recognition functionally may also be used to generate and send touch tone or DTMF tones such as in response to call trees or voice recognition functionality used by airlines, credit card companies, voice mail systems, and other applications. A system and method of audio processing which provides enhanced speech recognition is provided. Audio input is received at the microphone which is processed by adaptive noise cancellation to generate an enhanced audio signal. The operation of the speech recognition engine and the adaptive noise canceller may be advantageously controlled based on Voice Activity Detection (VAD).

3 Claims, 14 Drawing Sheets

(56) References Cited

U.S. PATENT DOCUMENTS

| | | | |
|---|---|---|---|
| 7,590,530 B2* | 9/2009 | Zhao et al. | 704/226 |
| 2003/0179888 A1* | 9/2003 | Burnett et al. | 381/71.8 |
| 2005/0143989 A1* | 6/2005 | Jelinek | 704/226 |
| 2005/0240401 A1* | 10/2005 | Ebenezer | 704/226 |
| 2006/0293882 A1* | 12/2006 | Giesbrecht et al. | 704/204 |
| 2007/0025281 A1* | 2/2007 | McFarland et al. | 370/286 |
| 2007/0237271 A1* | 10/2007 | Pessoa et al. | 375/346 |
| 2008/0056510 A1* | 3/2008 | Furuta et al. | 381/94.3 |
| 2009/0012786 A1* | 1/2009 | Zhang et al. | 704/233 |
| 2009/0089053 A1* | 4/2009 | Wang et al. | 704/233 |

OTHER PUBLICATIONS

Bernard Widrow and Samuel D. Stearns, "Adaptive Signal Processing", Pearson Education, 1985, ISBN-10 8131705323.

* cited by examiner

VOICE RECOGNITION IMPROVED ACCURACY IN MOBILE ENVIRONMENTS

RELATED PATENT APPLICATION AND INCORPORATION BY REFERENCE

This is a Continuation in Part Application of U.S. patent application Ser. No. 12/413,477 filed on Mar. 27, 2009 which is a utility application based upon U.S. patent application Ser. No. 61/040,273, entitled "Front-End Noise Reduction for Speech Recognition Engine" filed on Mar. 28, 2008. These related applications are incorporated herein by reference and made a part of this application. If any conflict arises between the disclosure of the CIP utility application and that in the related applications, the disclosure in this CIP utility application shall govern. Moreover, the inventor incorporates herein by reference any and all patents, patent applications, and other documents hard copy or electronic, cited or referred to in this application and the related applications.

BACKGROUND OF THE INVENTION (1) Field of the Invention

The invention relates generally to means and methods of providing clear, high quality voice with a high signal-to-noise ratio to a speech recognition engine to improve its efficiency. In particular, means and methods for developing an adaptive noise reduction scheme which reduces the background noise in the front-end to improve the performance of a speech recognition engine.

Linguists, scientists and engineers have endeavored for many years to construct machines that can recognize human speech. Although in recent years this goal has begun to be realized in certain aspects, currently available systems have not been able to produce results that even closely emulate human performance. This inability to provide satisfactory speech recognition is primarily due to difficulties that are involved in extracting and identifying the individual sounds that make up the human speech. These difficulties are exacerbated in noisy environments. Simplistically, speech may be considered as a sequence of sounds taken from a set of forty of so basic sounds called "phonemes". Different sounds, or phonemes, are produced by varying the shape of the vocal tract through muscular control of the speech articulators (lips, tongue, jaw etc.). A stream of a particular set of phonemes will collectively represent a word or a phrase. Thus, extraction of the particular phonemes contained within a speech signal is necessary to achieve voice recognition. This task becomes extremely difficult in noisy environments.

Most of the speech recognition systems use Hidden Markov Model technique to recognize speech. Markov model speech pattern templates are formed for speech analysis systems by analyzing identified speech patterns to generate frame sequences of acoustic feature signals representative thereof. The speech pattern template is produced by iteratively generating succeeding Markov model signal sets starting with an initial Markov model signal sets starting with an initial Markov model signal set.

Markov model signal set to generate a signal corresponding to the similarity there between. The iterations are terminated when said similarity signal is equal to or smaller than a predetermined value and the last formed Markov model signal set. A speech recognition system recognizes a speech uttered as one of a plurality of stored reference patterns. In a known speech recognition system, a speech uttered is converted into an input speech signal by an electromechanical transducer such as a microphone. The input speech signal is analyzed by a pattern analyzer and is converted into a digital input pattern signal. The input pattern signal is memorized in an iput memory as a memorized pattern. The memorized pattern is compared with each of the stored reference patterns in a reference memory and dissimilarity is produced there between. When a particular one of the reference patterns provides the minimum dissimilarity, the speech uttered is recognized as that particular reference pattern. Alternatively, when a specific one of reference patterns provides a specific dissimilarity smaller than a predetermined threshold, the speech uttered is recognized as the specific reference pattern.

In the actual recognition operation, the input speech signal is accompanied with noise due to presence of background sounds. The input speech signal and the noise are collectively referred to as an input signal and the noise are collectively referred to as an input sound signal. Accordingly, the input pattern signal includes a noise component. This results, in a worst case, the failure to recognize speech.

The present invention relates to a system for reducing the noise accompanying the speech uttered. It also relates to means and methods of providing clear, high quality voice with a high signal-to-noise ratio, in voice communication systems, devices, telephones, and methods, and more specifically, to systems, devices, and methods that automate control in order to correct for variable environment noise levels and reduce or cancel the environment noise prior to sending the voice communication over VoIP communication links.

As the popularity of VoIP communication systems increases, many users utilize them in a variety of environments. An increasing popular trend is to equip mobile terminals with an external microphone and speaker, allowing for "hands-free" operation. In addition, it is known to include a speech recognition device, so that the user, for example says, "Call home" by the voice command. While speech recognition technology is increasingly sophisticated, a clear separation of the voice component of an audio signal from noise components, i.e., a high Signal-to-Noise Ratio (SNR) is required for acceptable levels of accuracy in the speech recognition task. However, the movement of the microphone from adjacent the speaker's mouth, as in a hand held unit, introduces significant noise into the audio input signal. Thus, a noise reduction operation must be performed on the audio signal prior to speech recognition to obtain satisfactory results.

(2) The Related Art

Voice communication devices such as Voice over Internet Packets/Protocols telephones and other communication devices have become ubiquitous; they show up in almost every environment. People now use, or attempt to use such devices in a myriad of moderately noisy to excessively noisy environments such as airports, restaurants, bars, sporting events, movies, and concerts. The use of voice communication devices in noisy environments has lead to difficulty for listeners to discern a voice signal and has diminished network capacities as signal to noise ratios are lowered.

These systems and devices and their associated communication methods are referred to by a variety of names, such as but not limited to, voice over packets, or voice over Internet protocol or voice over Internet packets (VoIP), IP telephony, Internet telephony, and sometimes Digital IP phone.

These systems are used at home, office, inside a car, a train, at the airport, beach, restaurants and bars, on the street, and almost any other venue. As might be expected, these diverse environments have relatively higher and lower levels of background, ambient, or environmental noise. For example, there is generally less noise in a quiet home than there is in a crowded bar. If this noise, at sufficient levels, is picked up by the microphone, the intended voice communication degrades and though possibly not known to the users of the communication device, uses up more bandwidth or network capacity than is necessary, especially during non-speech segments in a two-way conversation when a user is not speaking.

Voice over Internet protocol routes voice conversations over the Internet or any other Internet Protocol (IP)-based network. The voice data flows over a general-purpose packet-switched network, instead of traditional dedicated, circuit-switched voice transmission lines. The protocols used to carry voice signals over the IP network are commonly referred to as Voice over IP or VoIP protocols. Voice over IP traffic might be deployed on any IP network, including for example, networks lacking a connection to the rest of the Internet, such as for instance on a private building-wide LAN.

The three most common quality issues affecting VoIP networks are Latency, Jitter, Packet Loss and Choppy unintelligible speech.

Latency generally refers to the physical distance that a phone call must travel to reach the service provider. When a phone call is made with VoIP, the signal is cut into thousands of little pieces, called packets, and then sent through the Internet to the service provider. These packets travel so fast that the process of traveling and reassembling them to the phone at the other end of the conversation generally takes milliseconds.

Usually, most users are not affected by latency with their VoIP providers. If the roundtrip travel time of the packet takes more than 250 milliseconds the quality of the communication may experience some issues due to latency. Most commonly, this occurs when trying to make international calls. Latency can occur in both VoIP and traditional phone systems. Of course, a variety of other factors, including congestion, can add to the overall latency of a packet.

Many VoIP providers have established multiple hosts to reduce latency and provide a quick connection from any location. One of the benefits of using VoIP over traditional phone systems is that internet speed is constantly increasing, helping to keep latency down. Additionally, many VoIP companies provide service centers located in specific areas to ensure latency is low, regardless of your location.

When packets are received with a timing variation from when they were sent, a quality issue of Jitter may be noticed. When Jitter occurs, participants on the call will notice a delay in phone conversation. Many VoIP providers reduce or eliminate Jitter by controlling for Jitter and time issues within their networking equipment. Although the overall delay impacts the quality of a voice call, another key consideration is the difference between when packets are expected to arrive and when they actually arrive—a concept known as "jitter". While it may not make a big difference if traditional data packets are received with timing variations between packets, it can seriously impact the quality of a voice conversation, where timing is everything. In order to compensate for the fact that voice packets can be received with variable rather than constant timing, VoIP endpoints implement what is known as a "dejitter buffer" in order to change the variable delay back to the expected constant delay expected.

Jitter is a variation in packet transit delay caused by queuing, contention and serialization effects on the path through the network. In general, higher levels of jitter are more likely to occur on either slow or heavily congested links. In order to facilitate later discussion we will define several types of jitter. Type A—constant jitter. This is a roughly constant level of packet to packet delay variation. Type B—transient jitter. This is characterized by a substantial incremental delay that may be incurred by a single packet. Type C—short term delay variation. This is characterized by an increase in delay that persists for some number of packets, and may be accompanied by an increase in packet to packet delay variation. Type C jitter is commonly associated with congestion and route changes.

In VoIP systems, Packet Loss can take place when a large amount of network traffic hits the same Internet connection. When talking on a VoIP system, Packet Loss can be identified with an echo or tin-like sound. Packet Loss is most commonly measured in percentages. For VoIP use, packet loss should not exceed 1%. A one percent packet loss will result in a skip or clipping approximately once every three minutes.

In modern VoIP environments, the speech is superposed by different levels of background noise. If the SNR is 6 dB, 30% energy of the signal transmitted is noise. This results in choppy unintelligible speech.

Significantly, in an on-going VoIP phone call or other communication from an environment having relatively higher environmental noise, it is sometimes difficult for the party at the other end of the conversation to hear what the party in the noisy environment is saying. That is, the ambient or environmental noise in the environment often "drowns out" the voice over internet or voice over packets or wire lined telephone user's voice, whereby the other party cannot hear what is being said or even if they can hear it with sufficient volume the voice or speech is not understandable. This problem may even exist in spite of the conversation using a high data rate on the communication network.

Attempts to solve this problem have largely been unsuccessful. Both single microphone and two microphone approaches have been attempted. U.S. Pat. No. 7,242,765 granted to Hairston describes headset cellular telephones for voice dialing and controlling other aspects of the cell phones in an ambient noise environment, but does not deal with the cancellation of the ambient noise in VoIP environments.

U.S. Pat. No. 6,937,980 to Krasny et al describes the noise cancellation for a speech recognition engine but uses a microphone array which is difficult to implement in a VoIP phone.

U.S. Pat. No. 6,415,034 to Hietanen et al patent describes the use of a second background noise microphone located within an earphone unit or behind an ear capsule. Digital signal processing is used to create a noise canceling signal which enters the speech microphone. Unfortunately, the effectiveness of the method disclosed in the Hietanen et al patent is compromised by acoustical leakage, where the ambient or environmental noise leaks past the ear capsule and into the speech microphone. The Hietanen et al patent also relies upon complex and power consuming expensive digital circuitry that may generally not be suitable for small portable battery powered devices such as pocket able cellular telephones.

Another example is U.S. Pat. No. 5,969,838 (the "Paritsky patent") which discloses a noise reduction system utilizing two fiber optic microphones that are placed side-by-side next to one another. Unfortunately, the Paritsky patent discloses a system using light guides and other relatively expensive and/or fragile components not suitable for the rigors of VoIP phones and other VoIP devices. Neither Paritsky nor Hietanen address the need to increase capacity in VoIP phone-based communication systems.

U.S. Pat. No. 5,406,622 to Silverberg et al uses two adaptive filters, one driven by the handset transmitter to subtract speech from a reference value to produce an enhanced reference signal; and a second adaptive filter driven by the enhanced reference signal to subtract noise from the transmitter. Silverberg et al require accurate detection of speech and non-speech regions. Any incorrect detection will degrade the performance of the system.

Previous approaches in noise cancellation have included passive expander circuits used in the electret-type telephonic microphone. These, however, suppress only low level noise occurring during periods when speech is not present. Passive noise-canceling microphones are also used to reduce background noise. These have a tendency to attenuate and distort the speech signal when the microphone is not in close proximity to the user's mouth; and further are typically effective only in a frequency range up to about 1 kHz.

Active noise-cancellation circuitry to reduce background noise has been suggested which employs a noise-detecting reference microphone and adaptive cancellation circuitry to generate a continuous replica of the background noise signal that is subtracted from the total background noise signal before it enters the network. Most such arrangements are still not effective. They are susceptible to cancellation degradation because of a lack of coherence between the noise signal received by the reference microphone and the noise signal impinging on the transmit microphone. Their performance also varies depending on the directionality of the noise; and they also tend to attenuate or distort the speech.

Known frequency domain noise reduction techniques, often introduce significant artifacts and aberrations into the speech audio component, making the speech recognition task more difficult. Hence there is a need in the art for a method of noise reduction or cancellation that is robust, suitable for VoIP use, and inexpensive to manufacture. The increased traffic in VoIP based communication systems has created a need in the art for means to provide a clear, high quality signal with a high signal-to-noise ratio.

There are several methods for performing noise reduction, but all can be categorized as types of filtering. In the related art, speech and noise are mixed into one signal channel, where they reside in the same frequency band and may have similar correlation properties. Consequently, filtering will inevitably have an effect on both the speech signal and the background noise signal. Distinguishing between voice and background noise signals is a challenging task. Speech components may be perceived as noise components and may be suppressed or filtered along with the noise components.

Even with the availability of modern signal-processing techniques, a study of single-channel systems shows that significant improvements in SNR are not obtained using a single channel or a one microphone approach. Surprisingly, most noise reduction techniques use a single microphone system and suffer from the shortcoming discussed above.

One way to overcome the limitations of a single microphone system is to use multiple microphones where one microphone may be closer to the speech signal than the other microphone. Exploiting the spatial information available from multiple microphones has lead to substantial improvements in voice clarity or SNR in multi-channel systems. However, the current multi-channel systems use separate front-end circuitry for each microphone, and thus increase hardware expense and power consumption.

The two microphone solution provides a new means and methods of increasing SNR in hand-held devices that capture sound with multiple microphones but use the circuitry or hardware of a single channel system. Adaptive noise cancellation is one such powerful speech enhancement technique based on the availability of an auxiliary channel, known as reference path, where a correlated sample or reference of the contaminating noise is present. This reference input is filtered following an adaptive algorithm, in order to subtract the output of this filtering process from the main path, where noisy speech is present.

As with any system, the two microphone systems also suffer from several shortfalls. The first shortfall is that, in certain instances, the available reference input to an adaptive noise canceller may contain low-level signal components in addition to the usual correlated and uncorrelated noise components. These signal components will cause some cancellation of the primary input signal. The maximum signal-to-noise ratio obtained at the output of such noise cancellation system is equal to the noise-to-signal ratio present on the reference input.

The second shortfall is that, for a practical system, both microphones should be worn on the body. This reduces the extent to which the reference microphone can be used to pick up the noise signal. That is, the reference input will contain both signal and noise. Any decrease in the noise-to-signal ratio at the reference input will reduce the signal-to-noise ratio at the output of the system. The third shortfall is that, an increase in the number of noise sources or room reverberation will reduce the effectiveness of the noise reduction system.

BRIEF SUMMARY OF THE INVENTION

The present invention overcomes shortfalls in the related art by presenting an unobvious and unique combination and configuration of components and methods to improve speech recognition systems. Unexpected results are achieved in that the disclosed methods of audio processing and other aspects of the invention produce immense increases in speech recognition rates. For example, FIG. 10b and FIG. 11b show unexpected results in signal quality by use of the disclosures herein.

It is the objective of the present invention to provide a method and a system that assists a speech recognition system, even in noisy conditions, to improve the speech recognition rate. The present invention comprises a method of audio processing which may advantageously be used in speech recognition. Audio input is received at the microphone. The audio input is processed by the noise reduction algorithm to generate an enhanced audio signal, on which voice activity is detected. The speech recognition engine may apply a speech recognition algorithm to the noise-suppressed audio signal and generate an appropriate output. The operation of the speech recognition engine and the adaptive noise canceller may be advantageously controlled based on the VAD detected audio signal.

The present invention provides a novel system and method for monitoring the noise in the environment in which a VoIP telephone is operating and cancels the environmental noise before it is transmitted to the other party so that the party at the other end of the voice communication link can more easily hear what the VoIP telephone user is transmitting.

The present invention preferably employs noise reduction and or cancellation technology that is operable to attenuate or even eliminate pre-selected portions of an audio spectrum. By monitoring the ambient or environmental noise in the location in which the VoIP telephone is operating and applying noise reduction and/or cancellation protocols at the appropriate time via analog and/or digital signal processing, it is possible to significantly reduce the ambient or background noise and improve the performance of a speech recognition engine.

The present invention has been developed in response to the present state of the art, and in particular, in response to the problems that have not been fully or completely solved by currently available solutions for speech recognition. It is therefore a primary objective of the present invention to provide a novel system and method that helps the speech recognition engine and improves its accuracy. In one aspect of the invention, the invention provides a system and method that enhances the convenience of using a VoIP or communications device, even in a location having relatively loud ambient or environmental noise.

In another aspect, the invention provides the speech recognition system a method that is capable of receiving and processing an incoming speech signal in real-time, thereby allowing the user to speak at normal conversational speeds. In yet another aspect of the invention, the invention provides a system and method for canceling ambient or environmental noise before the ambient or environmental noise is transmitted to a speech recognition engine for voice dialing or other aspects of a VoIP telephone.

In still another aspect of the invention, an enable/disable switch is provided on a VoIP telephone device to enable/disable the noise reduction.

These and other aspects of the present invention will become apparent upon reading the following detailed description in conjunction with the associated drawings. The present invention overcomes shortfalls in the related art with an adaptive noise cancellation algorithm. These modifications, other aspects and advantages will be made apparent when considering the following detailed descriptions taken in conjunction with the associated drawings.

DETAILED DESCRIPTION OF EMBODIMENTS OF THE INVENTION

Figure 1A:
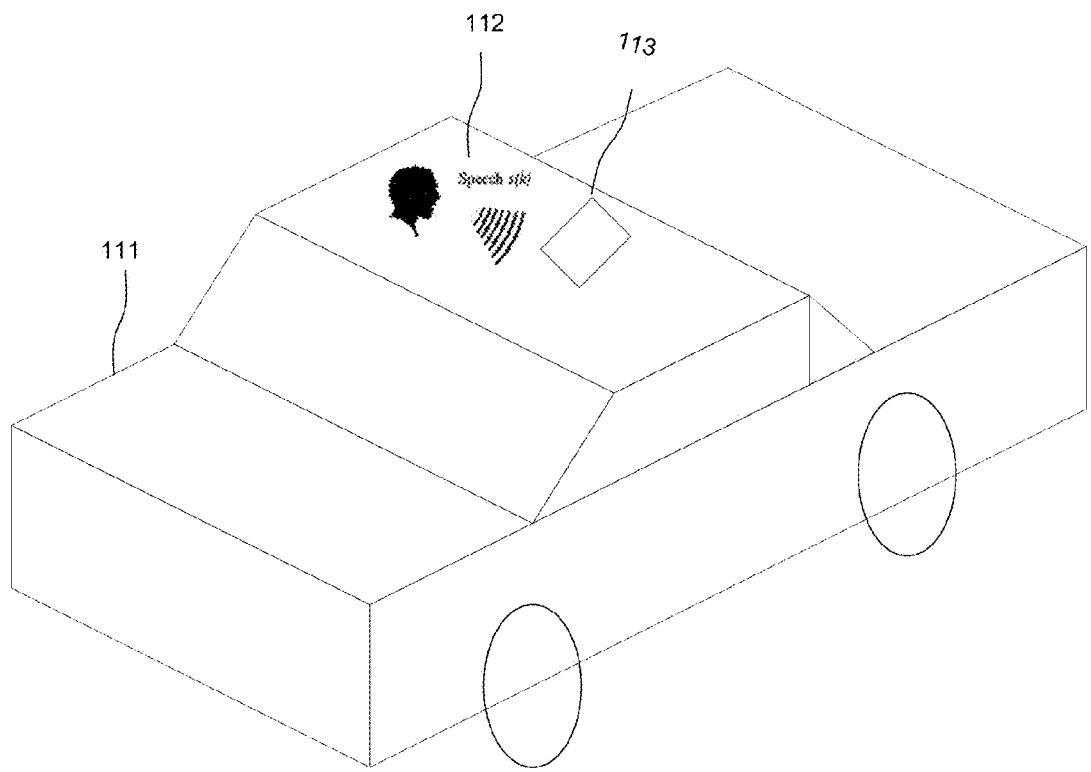
FIG. 1a is a diagram of an exemplary embodiment of a typical speech prior art recognition system present inside an automobile where speech is corrupted by background noise.

The following detailed description is directed to certain specific embodiments of the invention. However, the invention can be embodied in a multitude of different ways as defined and covered by the claims and their equivalents. In this description, reference is made to the drawings wherein like parts are designated with like numerals throughout.

Unless otherwise noted in this specification or in the claims, all of the terms used in the specification and the claims will have the meanings normally ascribed to these terms by workers in the art.

In communication, data processing and other information systems, it is desirable to provide speech recognition input and desired output for inquiries, commands and exchange of information. Such speech interface facilities permit interaction with data processing equipment and allow a user to communicate with devices in a natural manner without manually operating the device. Systems that use speech recognition are continually used for dialing telephone numbers and controlling other aspects of operation. VoIP phones, used in almost all environments, use speech recognition for dialing telephone numbers and controlling other aspects of operation. VoIP phones according to the present invention include a microphone, which may be internal or external, and allow the user to communicate unobtrusively, check voice mail and conduct other activities in an environment which can be noisy in general and extremely noisy sometimes. Speech recognition functionally may also be used to generate and send touch tone or DTMF tones such as in response to call trees or voice recognition functionality used by airlines, credit card companies, voice mail systems, and other applications.

In a speech recognition system, a method for describing an input pattern as one of reference patterns includes steps for calculating dissimilarities of the input pattern and the reference patterns and selecting a particular one of the dissimilarities which is lower than a threshold value. A system and method of audio processing which provides enhanced speech recognition is provided. Audio input is received at the microphone which is processed by adaptive noise cancellation to generate an enhanced audio signal. The speech recognition engine may apply a speech recognition algorithm to the noise-suppressed audio signal and generate the desired output. The operation of the speech recognition engine and the adaptive noise canceller may be advantageously controlled based on Voice Activity Detection (VAD).

The invention relates generally to means and methods of providing clear, high quality voice with a high signal-to-noise ratio to a speech recognition engine to improve its efficiency. In particular, means and methods for developing an adaptive noise reduction scheme which reduces the background noise in the front-end to improve the performance of a speech recognition engine. The method comprises the two adaptive steps of continually learning the background noise; and then applying an adaptive noise cancellation algorithm to reduce the background noise in various noisy conditions.

The present invention provides a novel and unique background noise or environmental noise reduction and/or cancellation feature for a communication device such as a voice over internet packets/protocols and other communication devices. While the present invention has applicability to at least these types of communications devices, the principles of the present invention are particularly applicable to all types of communication devices, as well as other devices that process or record speech in noisy environments such as voice recorders, dictation systems, voice command and control systems, and the like. For simplicity, the following description employs the term "telephone" or "VoIP telephone" as an umbrella term to describe the embodiments of the present invention, but those skilled in the art will appreciate the fact that the use of such "term" is not considered limiting to the scope of the invention, which is set forth by the claims appearing at the end of this description.

Hereinafter, preferred embodiments of the invention will be described in detail in reference to the accompanying drawings. It should be understood that like reference numbers are used to indicate like elements even in different drawings. Detailed descriptions of known functions and configurations that may unnecessarily obscure the aspect of the invention have been omitted.

FIG. 1a shows the typical speech recognition system inside an automobile. 112 is the speech source and 113 is the speech recognition engine which takes a signal as in input and performs the desired operation. For example, the user may say "Call Home" to make a phone call to his home.

Figure 1B:
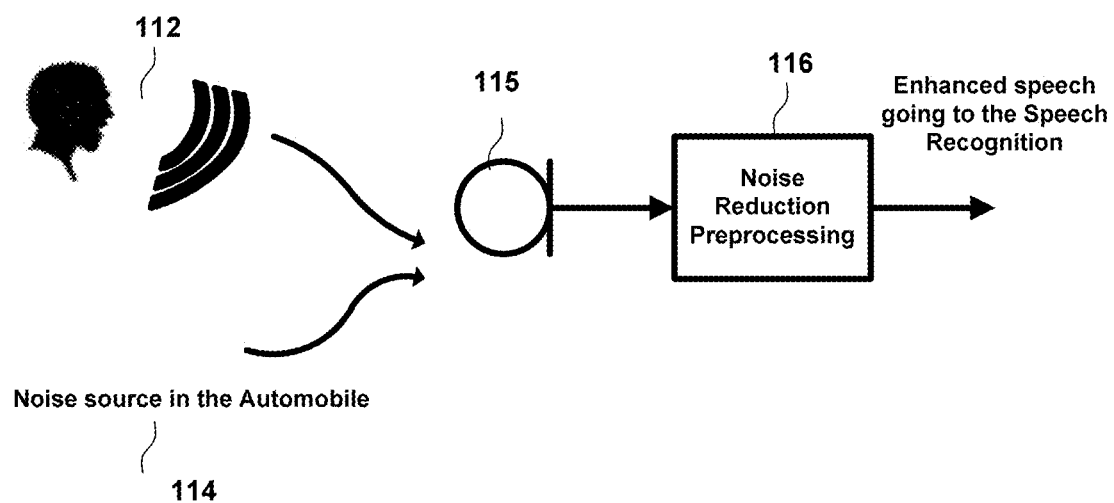
FIG. 1b is a diagram of an exemplary embodiment of the typical speech recognition system which receives an enhanced speech after the noise reduction pre processing in accordance with the principles of the invention.

In FIG. 1b, 112 is the speech source and 114 is the noise source. The microphone, 115, receives speech and noise. The noise reduction processing system, 116, reduces the noise. The windowed speech signal and noise signal are represented by s(k) and n(k) respectively. The sum of the two is then denoted by x(k), $$x(k)=s(k)+n(k) \quad (1)$$

Taking the Fourier Transform of both sides of equation (1) gives $$X(e^{jw}) = S(e^{jw}) + N(e^{jw}) \quad (2)$$

$$\text{Where } x(k) \xleftrightarrow{F.T} X(e^{jw})$$

In communication systems, the noise spectrum is generally averaged for the conversation, so that the listener is not affected by varying noise levels. To obtain the estimate of the noise spectrum the magnitude $|N(ej\omega)|$ of $N(ej\omega)$ is replaced by its average value $\mu(ej\omega)$ taken during the regions estimated as "noise only".

$$\mu(e^{jw})=E\{|N(e^{jw})|\}$$

Figure 2:
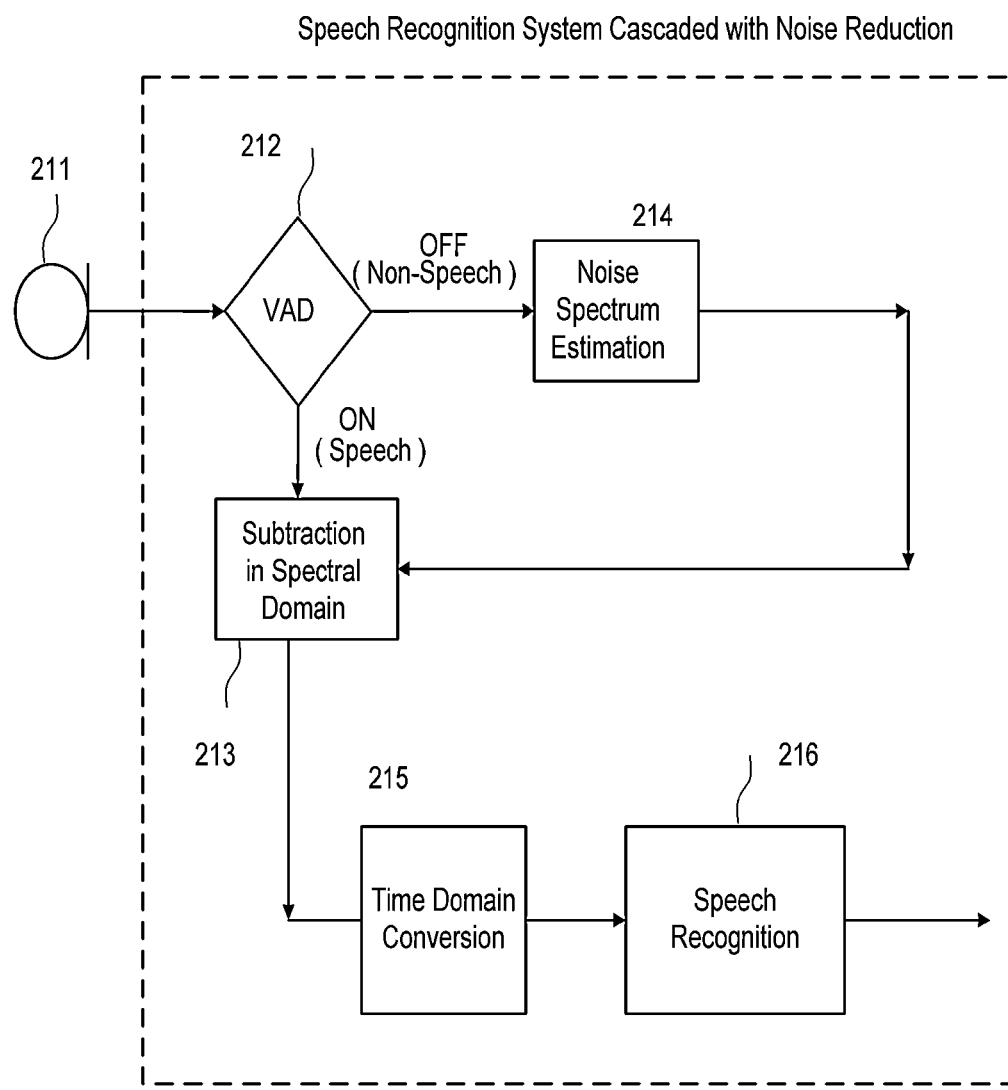
FIG. 2 is a diagram of an exemplary embodiment of the noise reduction system used in conjunction with the speech recognition engine in accordance with the principles of the invention.

FIG. 2 shows the proposed speech recognition system of the VoIP phone. 211 is the microphone of the VoIP phone. The microphone can be external or internal to the VoIP phone. Block 212 is the VAD which makes a decision on whether the input frame is speech or non-speech. If the VAD decides that the particular input frame is noise it is averaged, at 214, to overcome the artifacts. Block 213 is the spectral subtraction block of the system. 213 subtracts the background noise from the current speech frame and enhances the SNR of the input signal which helps the speech recognition engine 216. The spectral domain signal is converted to time domain at 215 before sending the signal to the speech recognition engine.

Figure 3:
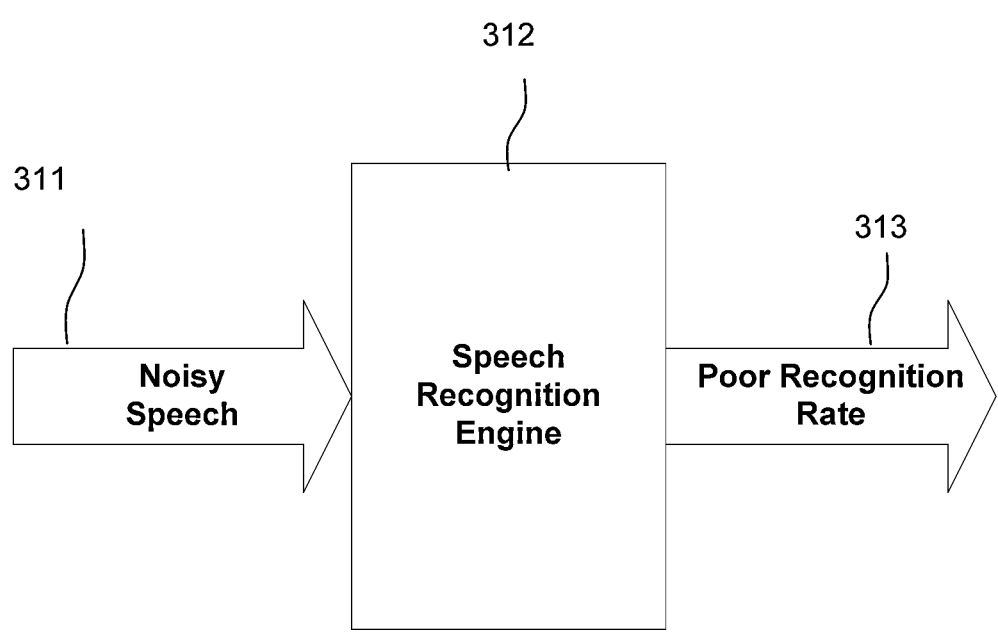
FIG. 3 is a diagram of an exemplary embodiment of a speech recognition system of the prior art which converts speech to text without the proposed noise reduction pre processing.

FIG. 3 is the speech recognition engine of a VoIP phone without the proposed noise reduction pre processing. 311 is the noisy speech and 312 is the speech recognition engine which converts the speech to desired text. 313 is the text with errors. The number of errors in block 313 depends upon the SNR at the input of the speech recognition system. The lower the SNR, the higher is the number of errors.

Figure 4:
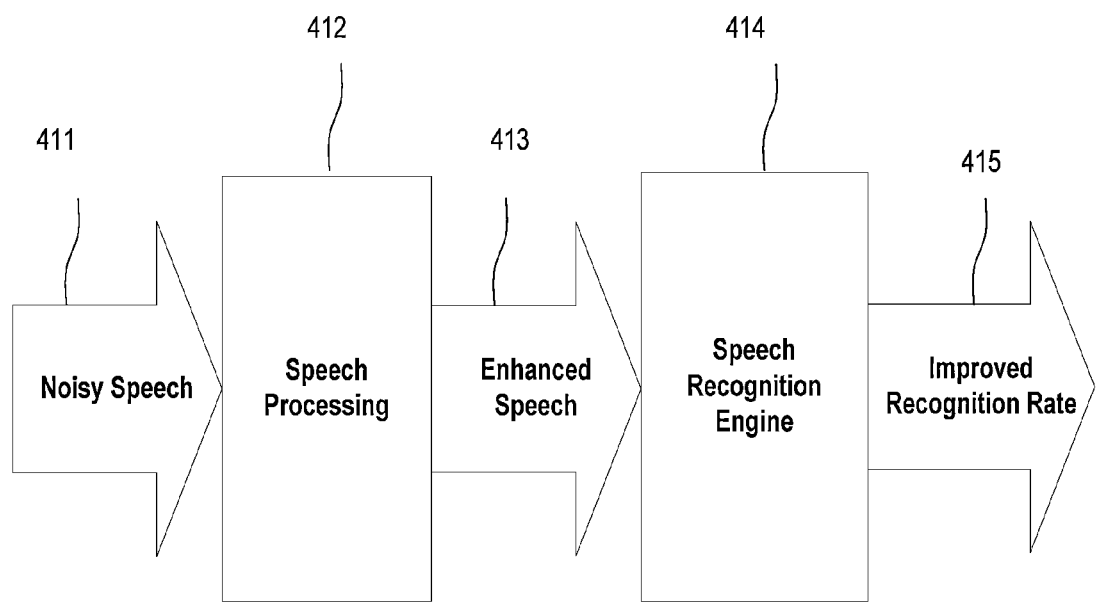
FIG. 4 is a diagram of an exemplary embodiment of a speech recognition system which converts speech to text with the proposed noise reduction pre processing in accordance with the principles of the invention.

FIG. 4 is the speech to text converter of a VoIP phone without the proposed noise reduction pre processing. In FIG. 4, 411 is the noisy speech. 412 is the Noise Reduction Pre Processing which adaptively learns the background noise and reduces the noise, thereby improving the SNR of the signal that is given to the speech recognition engine. 413 is the Noise Free speech. Block 414 is the speech recognition engine which converts the speech to desired text. 415 is the error free text even in high noise environments.

Figure 5:
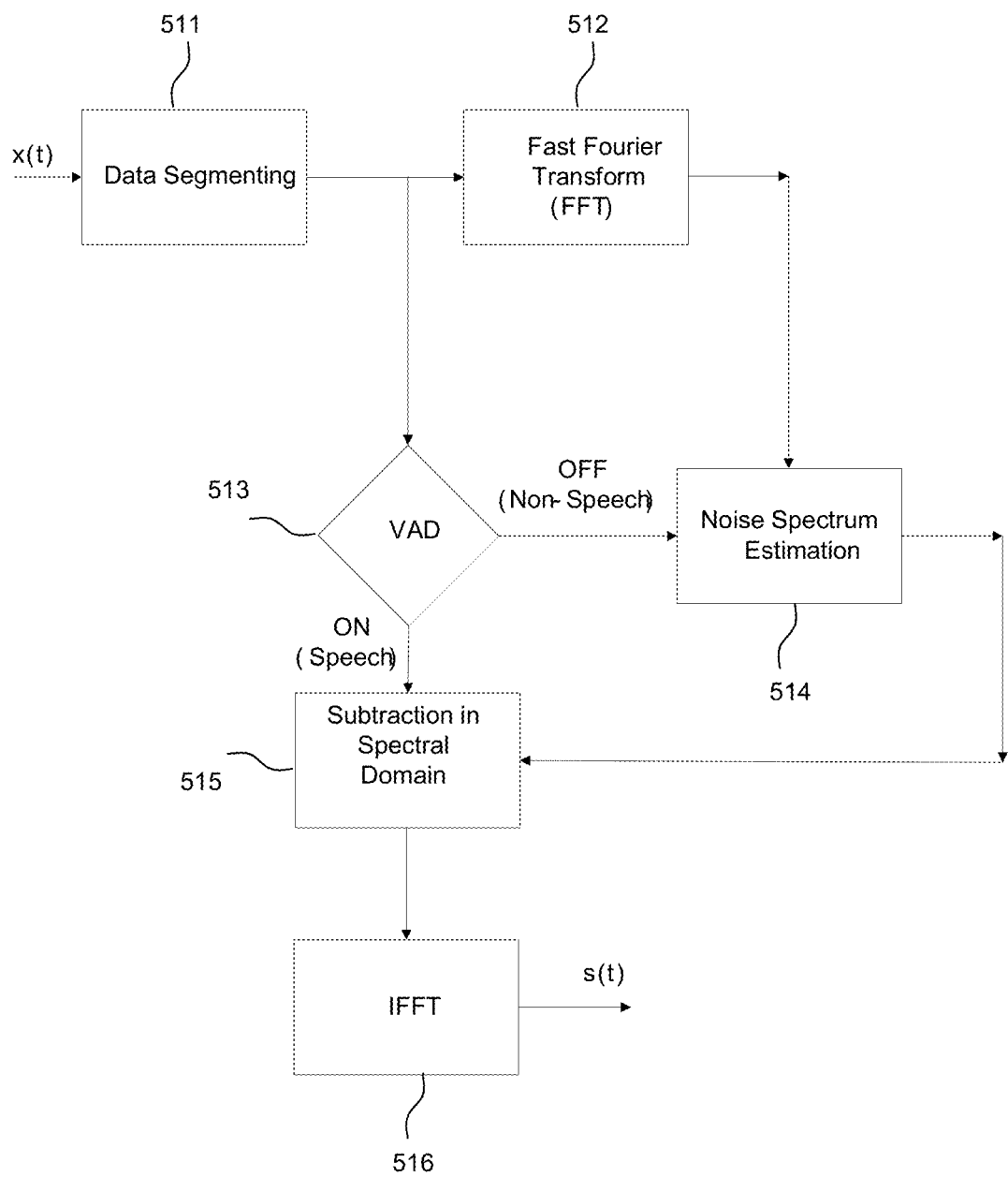
FIG. 5 is a diagram of an exemplary embodiment of the noise reduction pre processing technique used in the current invention.

FIG. 5 is the noise reduction pre processing technique used in the current invention. The data from the signal is segmented at 511. At 512, the Fast Fourier Transform is calculated. At 513, the decision whether the frame is speech or noise is made. This process is called Voice Activity Detection. A new technique for efficiently implementing the end-point decisions necessary to separate and segment speech from noisy background environments. The algorithm utilizes a set of computationally efficient production rules that are used to generate speech and noise metrics continuously from the input speech waveform. These production rules are based on statistical assumptions about the characteristics of the speech and noise waveform and are generated via time-domain processing to achieve a zero delay decision.

The noise spectrum estimator requires an estimation of the expected value of noise magnitude spectrum. This estimation is realized, at 514, by the exponential averaging of the noise magnitude spectrum during non-speech activity for a particular band.

$$E[N(k)]=\sigma \times E[N(k)]+(1-\sigma) \times |N(k)|$$

This averaging technique overcomes the effects of dramatic changes in the background noise level. If there is a sudden increase or decrease in the background noise level, the averaging helps in smoothing the noise level. The optimum value for σ is between 0.75 and 0.95. During speech activity the noise from the previous frames are taken into account At 515, the spectral subtraction is performed. Due to random variations of noise, spectral subtraction can result in negative estimates of the short-time magnitude or power spectrum. The magnitude and power spectrum are non-negative variables, and any negative estimates of these variables should be mapped into non-negative values. This nonlinear rectification process distorts the distribution of the restored signal. The processing distortion becomes more noticeable as the signal-to-noise ratio decreases. The IFFT of the resulting signal is taken at 516.

Figure 6:
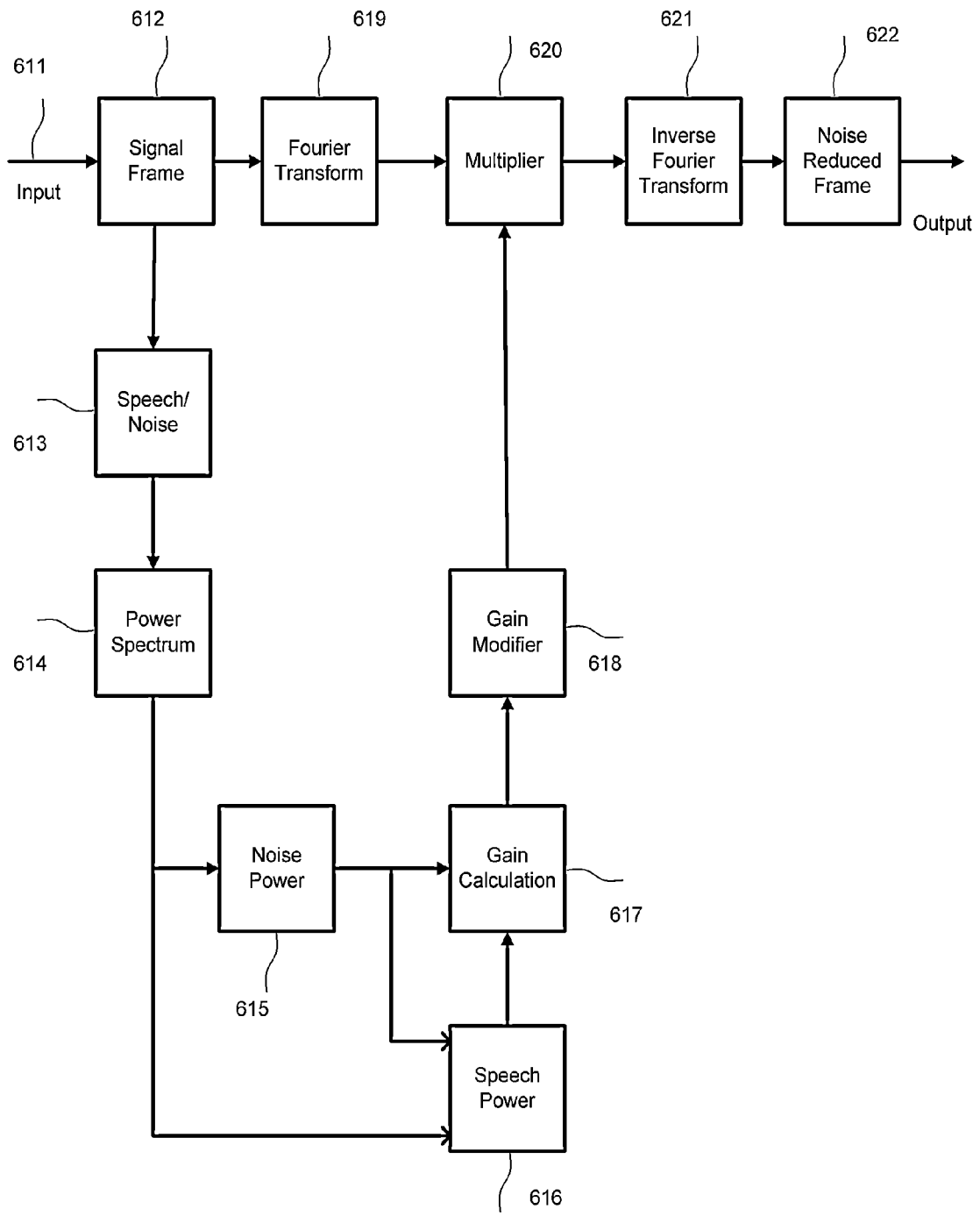
FIG. 6 is a diagram of an exemplary embodiment of the spectral subtraction technique used in the current invention.

FIG. 6 shows the spectral subtraction algorithm discussed in the current invention. 611 is the input signal that is divided into frames at 612. A decision on whether the frame is speech or non-speech is made at 613. The power spectrum is calculated at 614 which are then classified as noise power, 615 and speech power, 616. The noise power and speech power are used to calculate the gains at 617. The gains are modified accordingly at 618. The Fourier Transform of the signal calculated at 619 is multiplied with the gains at 620. The Inverse Fourier Transform is calculated at 621. The noise reduced frame 622 is the desired output.

Figure 7:
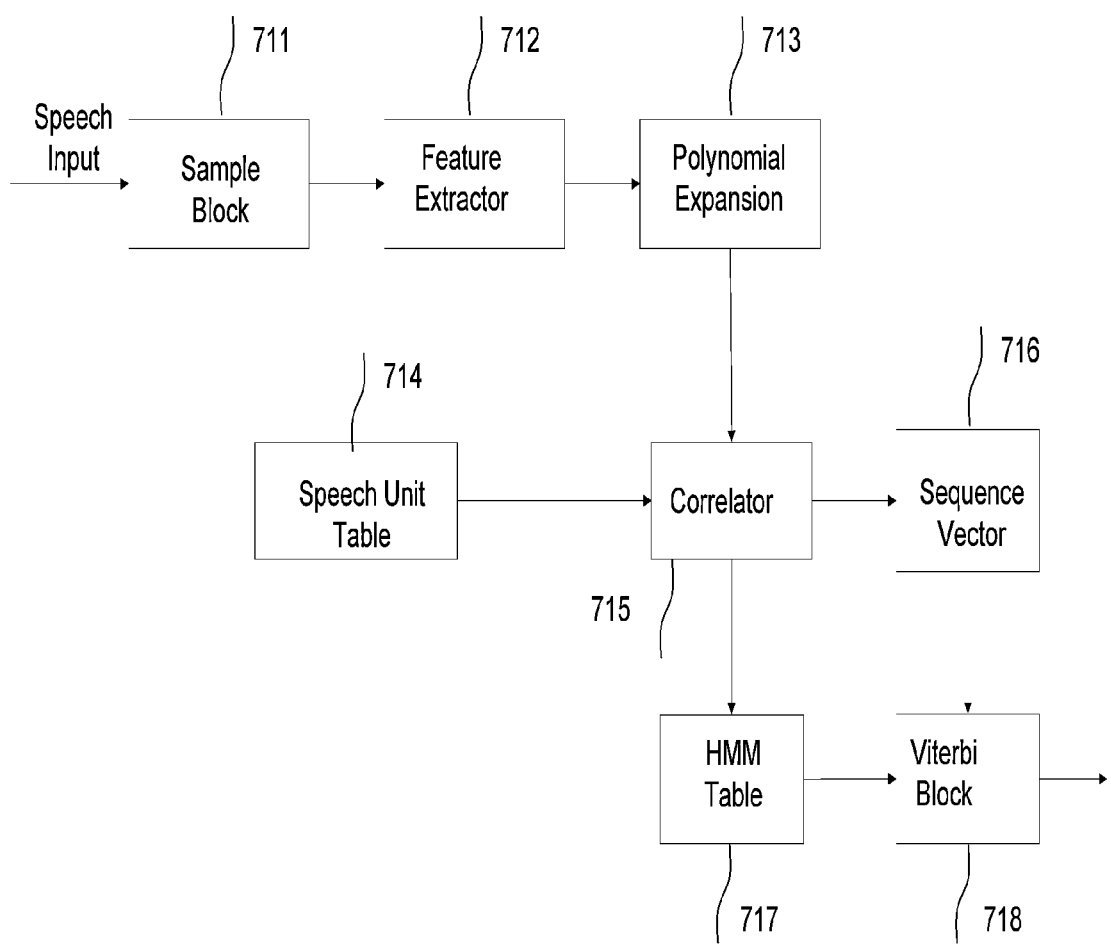
FIG. 7 is a diagram of an exemplary embodiment of a speech recognition engine which works on Hidden Markov Model principle.

FIG. 7 is a speech recognition system having a sampler block 711 and a feature extractor block 712 for extracting time domain and spectral domain parameters from a spoken input speech into a feature vector. A polynomial expansion block 713 generates polynomial coefficients from the feature vector. A correlator block 715, a sequence vector block 716, an HMM table 717 and a Viterbi block 718 perform the actual speech recognition based on the speech units stored in a speech unit table 714 and the HMM word models stored in the HMM table. The HMM word model that produces the highest probability is determined to be the word that was spoken.

Figure 8:
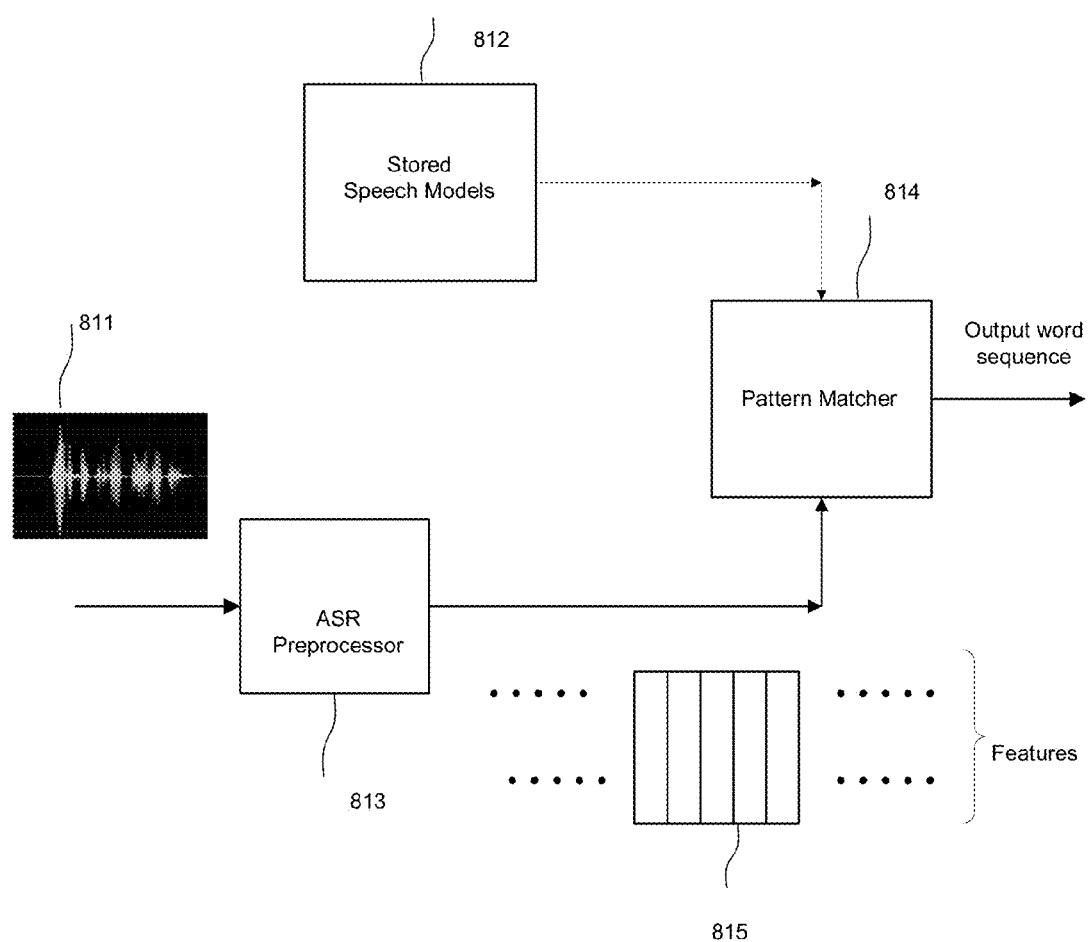
FIG. 8 is diagram of an exemplary embodiment of the speech corrupted by automobile noise without the processing discussed in the current invention.

FIG. 8 shows a typical Automatic Speech Recognition Engine where 811 is the speech source. The ASR speech pre processor, 813, converts speech waveform into a sequence of feature vectors that describe the speech spectrum. Typically, the feature vectors, 815, consist of 39 different parameters each of 10 ms of speech. Different words must give distinctly different feature vectors. Different utterances of the same word must give similar feature vectors. Pattern matcher, 814, uses previously stored speech models, 812, to select the sequence of words that is the best match. In an ASR system, the pattern matcher uses an explicit mathematical model of speech to calculate the probability that a speech signal corresponds to a particular sequence of words. The mathematical model incorporates knowledge about the nature of speech and selects the sequence of words that yields the highest probability. ASR system uses an iterative algorithm to adjust their parameter values to match training examples of speech whose corresponding word sequences are known.

Figure 9:
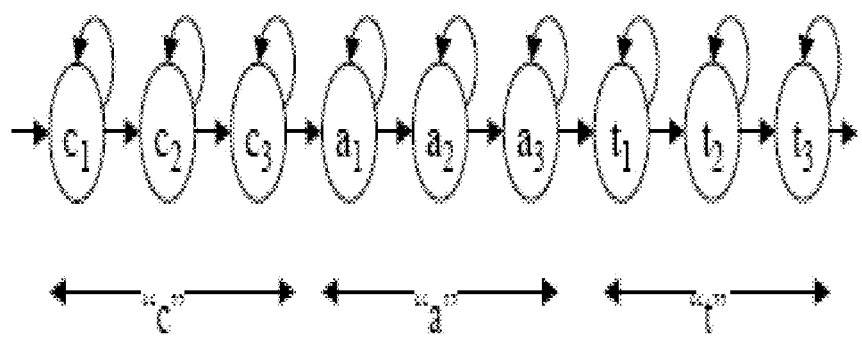
FIG. 9 is a diagram of a speech production model with 3 states per phenome for the word "cat".

FIG. 9 shows the speech production model of the word "cat" by a speaker. Each phoneme in a word corresponds to a number of model states. Typically there are 3 states per phoneme. Each model state represents a distinct sound with its own acoustic spectrum. The feature vectors corresponding to a particular state will be similar but will vary somewhat on different occasions and for different speakers. When saying a word, the speaker stays in each state for one or more frames and then goes on to the next state. The time in each state will vary according to how fast a person is speaking. Some speech sounds last longer than others.

Figure 10A:
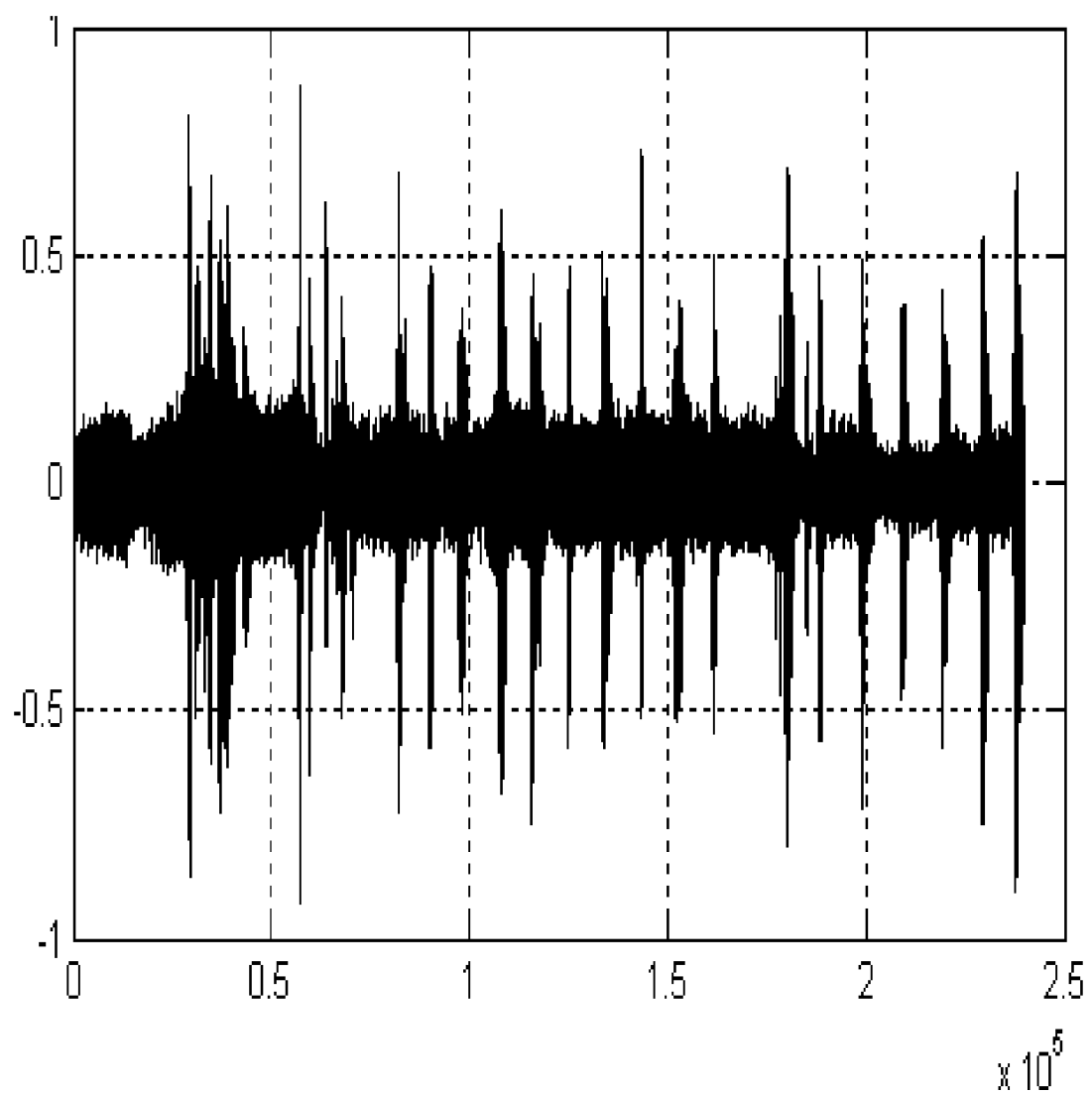
FIG. 10a is a sound chart showing speech corrupted with car noise and without the noise reduction methods as disclosed herein.
Figure 10B:
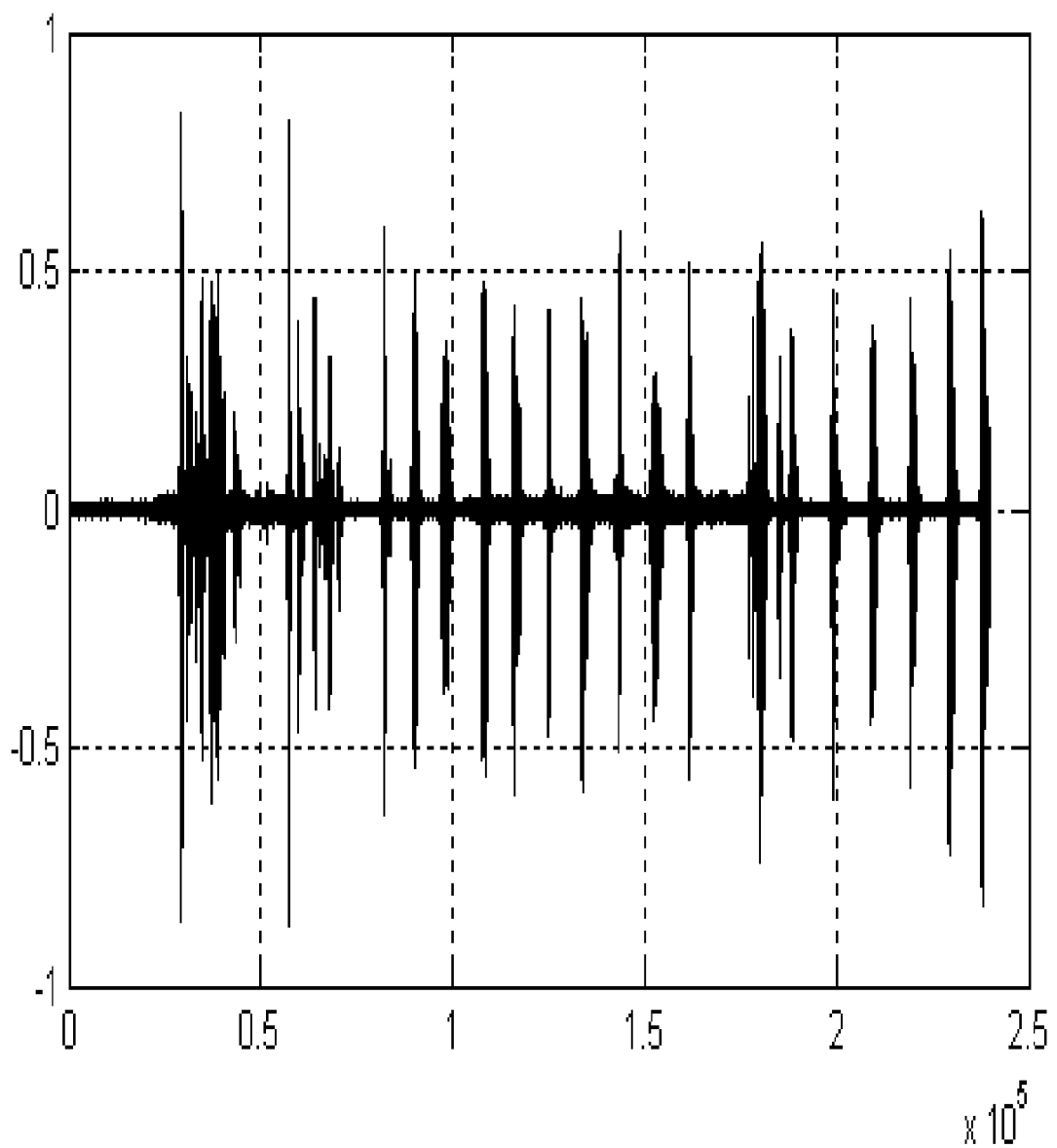
FIG. 10b is a sound chart showing speech corrupted with car noise but then improved by use of the noise reduction methods as disclosed herein.

FIG. 10a shows the speech corrupted with car noise without the noise reduction algorithm as discussed in the current invention. FIG. 10b shows the speech corrupted with car noise with the noise reduction algorithm as discussed in the current invention.

Figure 11A:
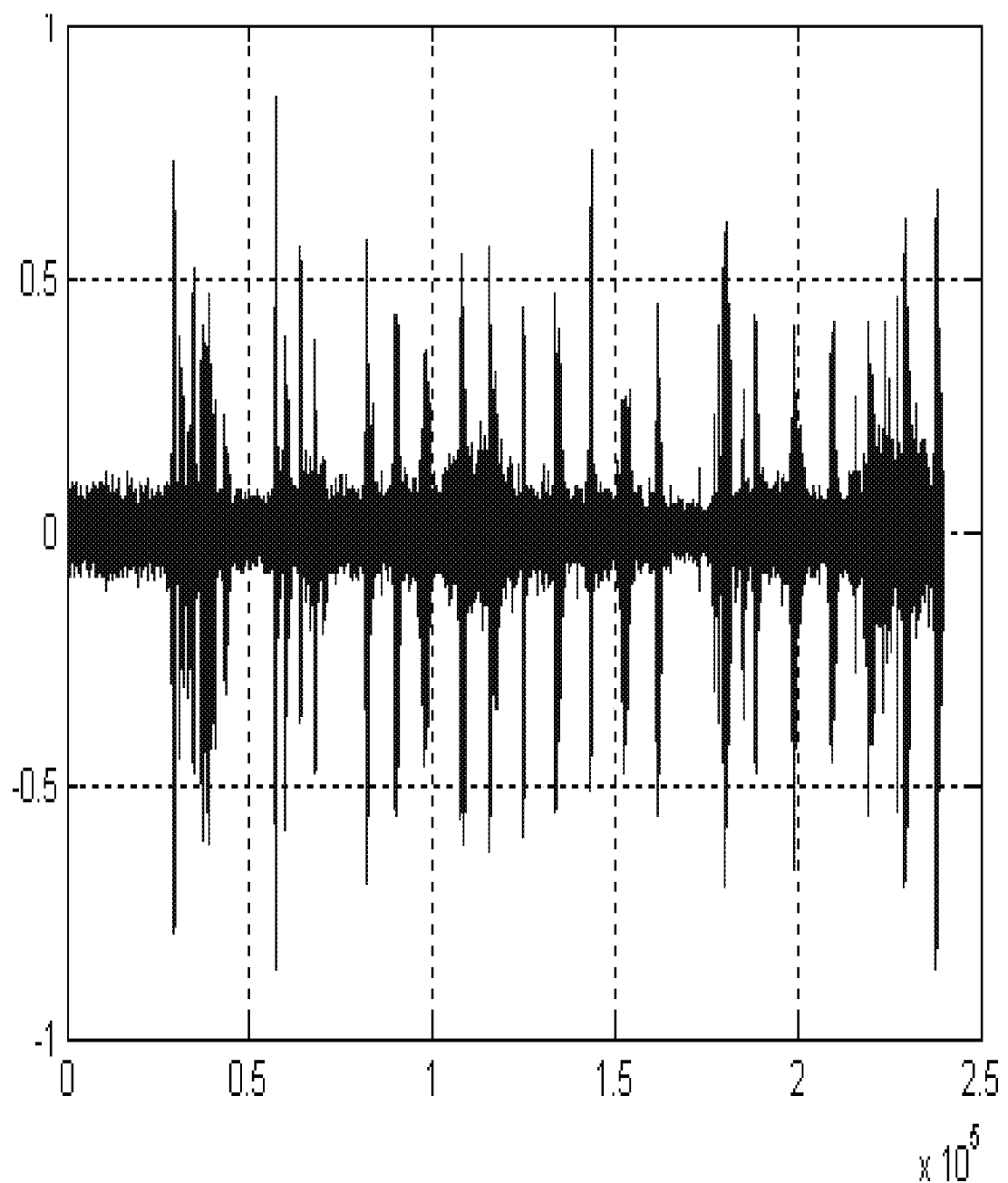
FIG. 11a is a sound chart showing speech corrupted with street noise and without the noise reduction methods as disclosed herein.
Figure 11B:
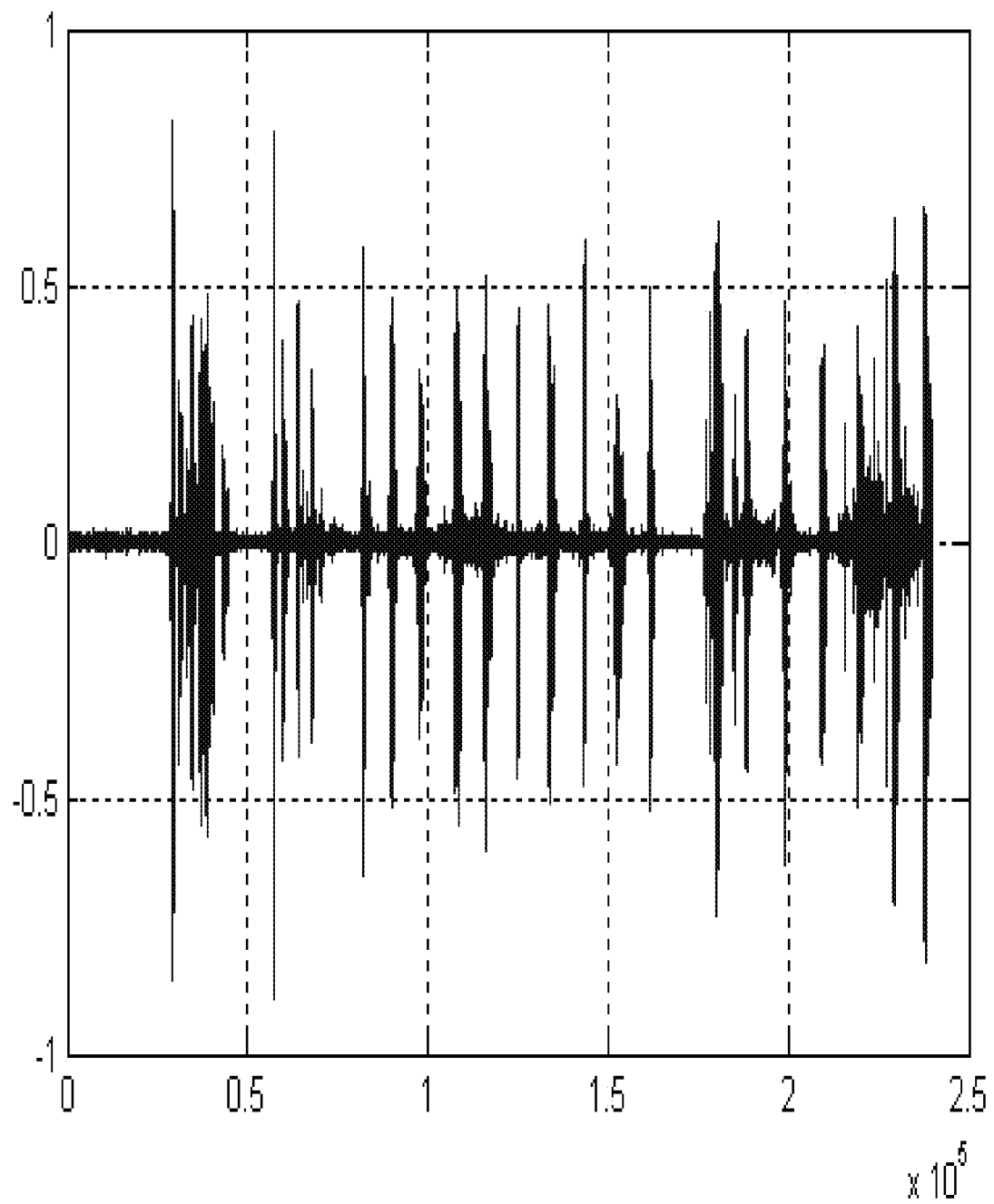
FIG. 11b is a sound chart showing speech corrupted with street noise but then improved by use of the noise reduction methods as disclosed herein.

FIG. 11a shows the speech corrupted with street noise without the noise reduction algorithm as discussed in the current invention. FIG. 11b shows the speech corrupted with street noise with the noise reduction algorithm as discussed in the current invention.

As described hereinabove, the invention has the advantages of improving the signal-to-noise ratio by reducing noise in various noisy conditions, enabling the conversation to be pleasant. While the invention has been described with reference to a detailed example of the preferred embodiment thereof, it is understood that variations and modifications thereof may be made without departing from the true spirit and scope of the invention. Therefore, it should be understood that the true spirit and the scope of the invention are not limited by the above embodiment, but defined by the appended claims and equivalents thereof.

Unless the context clearly requires otherwise, throughout the description and the claims, the words "comprise," "comprising" and the like are to be construed in an inclusive sense as opposed to an exclusive or exhaustive sense; that is to say, in a sense of "including, but not limited to." Words using the singular or plural number also include the plural or singular number, respectively. Additionally, the words "herein," "above," "below," and words of similar import, when used in this application, shall refer to this application as a whole and not to any particular portions of this application.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while steps are presented in a given order, alternative embodiments may perform routines having steps in a different order. The teachings of the invention provided herein can be applied to other systems, not only the systems described herein. The various embodiments described herein can be combined to provide further embodiments. These and other changes can be made to the invention in light of the detailed description.

All the above references and U.S. patents and applications are incorporated herein by reference. Aspects of the invention can be modified, if necessary, to employ the systems, functions and concepts of the various patents and applications described above to provide yet further embodiments of the invention.

These and other changes can be made to the invention in light of the above detailed description. In general, the terms used in the following claims, should not be construed to limit the invention to the specific embodiments disclosed in the specification, unless the above detailed description explicitly defines such terms. Accordingly, the actual scope of the invention encompasses the disclosed embodiments and all equivalent ways of practicing or implementing the invention under the claims.

While certain aspects of the invention are presented below in certain claim forms, the inventors contemplate the various aspects of the invention in any number of claim forms. Accordingly, the inventors reserve the right to add additional claims after filing the application to pursue such additional claim forms for other aspects of the invention.

The invention includes, but is not limited to, the following items:

Item 1. A system comprising:
a) a microphone 211 of a VoIP phone, the microphone being internal or external to a VoIP phone;
b) means of delivery of an input frame from the microphone 211 to a VAD 212, the VAD having means of deciding whether the input frame is speech or non speech (non speech is also defined as "noise") and the VAD having means of:
 i. directing an input frame of non speech to a noise spectrum estimation component 214, wherein the input frame is averaged to overcome artifacts;
 ii. directing an input frame of speech to a spectral subtraction block 213 which has means of subtracting background noise from the current speech frame and enhancing the SNR of an input signal, after the signal exits the subtraction block the signal then enters a time domain conversion component 215 wherein the signal is converted to time domain before the signal travels to a speech recognition engine 216.

Item 2. The system of item 1 wherein the spectral subtraction block 213 works as follows:
a) an input signal 611 is divided into frames 612;
b) a decision on whether the frame is composed of speech or non speech is made within a speech noise selection component 613;
c) a power spectrum 614 is then calculated and then classified as speech power 616 or noise power 615;
d) noise power 615 and speech power 616 are used to calculate gain 617;

e) gain is modified 618;
f) a Fourier Transform of the signal from the signal frame component 612 is calculated and multiplied 620 with the modified gain 618;
g) the resulting product of the multiplication 620 is then used to calculate an Inverse Fourier Transform; and
h) the resulting noise reduced frame 622 is the desired output.

Item 3. A method of noise reduction, the method comprising:
a) accepting an input x(t) of data;
b) segmenting the data 511;
c) a Fast Fourier Transform is calculated 512 by use of the segmented data;
d) the segmented data undergoes voice activity detection 513 ("VAD") wherein speech and noise metrics are continuously calculated from the input speech waveform which are then used to classify speech and non-speech regions. The metrics are based on statistical assumptions about the characteristics of the speech and noise and are generated via time-domain processing to achieve a zero delay decision.
e) non speech data, as determined by VAD undergoes noise spectrum estimation 514 and speech data, as determined by VAD undergoes subtraction in spectral domain.
f) non speech data undergoing noise spectrum estimation requires an estimation of the expected value of noise magnitude spectrum, this estimation is realized 514, by the exponential averaging of the noise magnitude spectrum during non-speech activity for a particular band, wherein:

$$E[N(k)] = \sigma \times E[N(k)] + (1-\sigma) \times |N(k)|$$

and the optimum value for o is between 0.75 and 0.95.
g) speech data undergoes spectral subtraction; due to random variations of noise, spectral subtraction can result in negative estimates of the short-time magnitude or power spectrum; the magnitude and power spectrum are non-negative variables, and any negative estimates of these variables should be mapped into non-negative values; the resulting IFFT (Inverse Discrete Fourier Transformation 516 then found and used as s(t).

Item 4. A system for speech recognition, the system comprising:
a) a sampler block 711 with means to accept speech input;
b) a feature extractor block 712 with mean to accept input from the sampler block 711, the feature extractor 712 having means of extracting time and domain and spectral domain parameters from spoken input speech into a feature vector;
c) a polynomial expansion block 713 with means to accept input from the feature extractor block 712, the polynomial expansion block 713 having means to generate polynomial coefficients from input received from the feature extractor block 712;
d) a correlator block 715 with means of accepting input from the polynomial expansion block 713 and from a speech unit table 714; the correlator block 715 having means of directing output to a sequence vector block 716 and to a HMM table block 717;
e) a viterbi block 718 with means of accepting input from the HMM table 717 and the sequence vector block 716; and
f) the correlator block 715, sequence vector block 716, HMM table block 717 and Viterbi block 718 perform the actual speech recognition based on speech units stored in the speech unit table 714 and HMM word models stored in the HMM table block 717, the HMM word model that produces the highest probability is determined to be the word that was spoken.

What is claimed is:
1. A system comprising:
a) a microphone of a voice over internet protocol (VoIP) phone, the microphone being internal or external to the VoIP phone;
b) delivery of an input frame from the microphone to a voice activity detection (VAD) system, the VAD system determining, using one or more processors, whether the input frame is speech or non-speech and the VAD system performing the steps of:
i. directing an input frame of non-speech to a noise spectrum estimation component, wherein the input frame is averaged to overcome artifacts;
ii. obtaining an estimation of an expected value of a noise magnitude spectrum by exponential averaging of the noise magnitude spectrum during non-speech activity for a particular band wherein:

$$E[N(k)] = \sigma \times E[N(k)] + (1-\sigma) \times |N(k)|$$

and the optimum value for σ is between 0.75 and 0.95; and
iii. directing an input frame of speech to a spectral subtraction block which subtracts background noise from the input frame of speech, the input frame of speech then enters a time domain conversion component and is converted to time domain and them becomes a speech input and the speech input travels to a sampler block;
c) the sampler block accepts the speech input;
d) a feature extractor block accepts input from the sampler block, the feature extractor block extracts time and domain and spectral domain parameters from the input speech into a feature vector;
e) a polynomial expansion block accepts input from the feature extractor block, the polynomial expansion block generates polynomial coefficients;
f) a correlator block accepts input from the polynomial expansion block and from a speech unit table, the correlator block directs output to a sequence vector block and to a hidden markov model (HMM) table block;
e) a viterbi block accepts input from the HMM table block and the sequence vector block; and
f) the correlator block, sequence vector block, HMM table block and Viterbi block perform speech recognition based on speech units stored in the speech unit table and HMM word models stored in the HMM table block, the HMM word model that produces the highest probability is determined to be the word that was spoken.

2. The system of claim 1 wherein the spectral subtraction block works as follows:
a) an input signal is divided into frames;
b) a decision on whether the frame is composed of speech or non-speech is made within a speech noise selection component;
c) a power spectrum is then calculated and then classified as speech power or noise power;
d) noise power and speech power are used to calculate gain;
e) gain is modified;
f) a Fourier Transform of the signal from the signal frame component is calculated and multiplied with the modified gain;
g) the resulting product of the multiplication is then used to calculate an Inverse Fourier Transform; and
h) the resulting noise reduced frame is the desired output.

3. A method of noise reduction, the method comprising: one or more processors performing the steps of:
a) accepting an input x(t) of data;
b) segmenting the data to produce segmented data;

c) a Fast Fourier Transform is calculated by use of the segmented data;

d) the segmented data undergoes voice activity detection ("VAD") wherein speech and noise metrics are continuously calculated from an input speech waveform which are then used to classify speech and non-speech regions, the metrics are based on statistical assumptions about the characteristics of the speech and noise and are generated via time-domain processing to achieve a zero delay decision;

e) non speech data, as determined by VAD undergoes noise spectrum estimation and speech data, as determined by VAD undergoes subtraction in spectral domain;

f) non speech data undergoing noise spectrum estimation requires an estimation of the expected value of noise magnitude spectrum, this estimation is realized by exponential averaging of the noise magnitude spectrum during non-speech activity for a particular band, wherein:

$E[N(k)] = \sigma \times E[N(k)] + (1-\sigma) \times |N(k)|$ and the optimum value for $\sigma$ is between 0.75 and 0.95;

g) speech data undergoes spectral subtraction; due to random variations of noise, spectral subtraction can result in negative estimates of the short-time magnitude or power spectrum; the magnitude and power spectrum are non-negative variables, and any negative estimates of these variables are mapped into non-negative values; the resulting IFFT (Inverse Discrete Fourier Transformation) is found and used as s(t);

h) using a sampler block to accept speech input;

i) using a feature extractor block to accept input from the sampler block, the feature extractor block extracting time and domain and spectral domain parameters from spoken input speech into a feature vector;

j) using a polynomial expansion block to accept input from the feature extractor block, the polynomial expansion block generating polynomial coefficients from input received from the feature extractor block;

k) a correlator block accepting input from the polynomial expansion block and from a speech unit table, the correlator block directing output to a sequence vector block and to a hidden markov model (HMM) table block;

l) a viterbi block accepting input from the HMM table block and the sequence vector block; and m) the correlator block, sequence vector block, HMM table block and Viterbi block performing speech recognition based on speech units stored in the speech unit table and HMM word models stored in the HMM table block, the HMM word model that produces the highest probability is determined to be the word that was spoken.

* * * * *